(12) United States Patent
Reznik

(10) Patent No.: US 6,361,715 B1
(45) Date of Patent: Mar. 26, 2002

(54) METHOD FOR REDUCING THE REDOX POTENTIAL OF SUBSTANCES

(76) Inventor: David Reznik, 12690 Viscaino Rd., Los Altos Hills, CA (US) 94022

( * ) Notice: Subject to any disclaimer, the term of this patent is extended or adjusted under 35 U.S.C. 154(b) by 0 days.

(21) Appl. No.: 09/285,597

(22) Filed: Apr. 2, 1999

Related U.S. Application Data

(60) Division of application No. 08/617,741, filed as application No. PCT/US94/10362 on Sep. 13, 1994, now Pat. No. 5,951,839, which is a continuation-in-part of application No. 08/121,264, filed on Sep. 13, 1993, now abandoned, and a continuation of application No. 08/441,636, filed on May 15, 1995, now Pat. No. 5,797,216.

(51) Int. Cl.$^7$ .............................................. B01D 53/22
(52) U.S. Cl. .......................... 252/374; 95/55; 210/650; 210/651; 423/648.1; 423/659; 252/372; 252/375
(58) Field of Search ............................ 210/650, 761, 210/651; 252/374, 375, 372; 95/55; 423/659

(56) References Cited

U.S. PATENT DOCUMENTS

| | | | | |
|---|---|---|---|---|
| 4,369,115 A | * | 1/1983 | Bauer | 210/761 |
| 4,384,959 A | * | 5/1983 | Bauer et al. | 210/761 |
| 5,384,051 A | * | 1/1995 | McGinness | 210/761 |
| 5,545,337 A | * | 8/1996 | Hong | 210/761 |
| 5,614,087 A | * | 3/1997 | Le | 210/761 |

* cited by examiner

Primary Examiner—Wayne Langel
(74) Attorney, Agent, or Firm—Darby & Darby

(57) ABSTRACT

Apparatus and a method of providing a water-based fluid with active hydrogen having selected characterstics including providing at least one material (10) having selected characteristics and supply of hydrogen atoms from at least one material (10) to fluid, whereby the fluid receives hydrogen atoms from the material (10), which hydrogen atoms have the selected characteristics.

8 Claims, 10 Drawing Sheets

METHOD FOR REDUCING THE REDOX POTENTIAL OF SUBSTANCES

This is a division, of application Ser. No. 08/617,741, filed Jul. 15, 1996, U.S. Pat. No. 5,951,839; which is a 371 of PCT/US94/10362, filed Sep. 13, 1994; which is a continuation-in-part of application Ser. No. 08/121,264, filed Sep. 13, 1993, now abandoned, and a continuation of Ser. No. 08/441,636 filed May 15, 1995 now U.S. Pat. No. 5,797,216 issued Aug. 25, 1998. Each of these prior applications is hereby incorporated herein by reference, in its entirety.

FIELD OF THE INVENTION

The present invention relates to apparatus and methods for controlling the redox potential and the characteristics of hydrogen contained in water and to various uses of such water.

BACKGROUND OF THE INVENTION

It is well known that all biological systems live by undergoing oxidation and reduction reactions.

It is generally accepted that oxidation and the presence of an excess of hydroxyl free radicals produce degradation in certain biological systems in living organisms.

Specifically, scientific literature attributes certain cancers and other diseases such as Parkinsons disease to uncontrolled oxidation. Failure of the body's protective systems to quench the excess oxidizing free radicals leads to uncontrolled reactions resulting in such diseases.

It is known to improve water quality by electrolysis. A home unit for water improvement is manufactured and sold by Ange Systems, Inc. and distributed by Sanyo Trading Co., Ltd. in Tokyo, Japan and provides both acidic and alkaline water supplies. The acidic water is proposed for use as an antiseptic, while the alkaline water is proposed for use as drinking water.

There also exist certain contexts in which oxidation of undesired biological entities is desired. One example is the operation of oxidizing drugs, such as silver nitrate, which kill certain microorganisms.

SUMMARY OF THE INVENTION

There is provided in accordance with a preferred embodiment of the present invention a method of providing a water-based fluid with active hydrogen having selected characteristics comprising the steps of:
  providing at least one material having selected characteristics; and
  causing supply of hydrogen atoms from the at least one material to the fluid, whereby the fluid receives hydrogen atoms from the material, which hydrogen atoms have the selected characteristics.

There is also provided in accordance with a preferred embodiment of the present invention a method of providing a water-based fluid with active hydrogen having selected characteristics, comprising the steps of:
  providing at least one material having selected characteristics; and
  supplying hydrogen atoms from the at least one material, without the remainder of the material, to the fluid.

In accordance with one embodiment of the invention, the fluid is oxidized prior to supply of hydrogen atoms thereto.

In accordance with another embodiment of the invention, the fluid is oxidized following supply of hydrogen atoms thereto.

Preferably, the at least one material comprises a plurality of materials, which may be selected from metals and elements in electrolyte solutions.

The plurality of materials may include drugs, olfactory compounds, or other organic compounds.

There is also provided in accordance with a preferred embodiment of the present invention apparatus for providing a water-based fluid with active hydrogen having selected characteristics comprising:
  at least one material having selected characteristics; and
  a hydrogen transfer facility providing supply of hydrogen atoms from the at least one material to the fluid, whereby the fluid receives hydrogen atoms from the material, which hydrogen atoms have the selected characteristics.

There is additionally provided in accordance with a preferred embodiment of the present invention apparatus for providing a water-based fluid with active hydrogen having selected characteristics, comprising:
  at least one material having selected characteristics; and
  a hydrogen supply facility supplying hydrogen atoms from the at least one material, without the remainder of the material, to the fluid.

Further in accordance with a preferred embodiment of the present invention there is provided apparatus for providing a water-based fluid with active hydrogen having selected characteristics comprising:
  a container for at least one material having selected characteristics, the container including an inlet for receiving hydrogen and at least one wall which permits hydrogen diffusion therethrough; and
  a hydrogen exchanger, communicating with the container and causing exchange of hydrogen atoms between the material and the fluid, whereby the fluid receives hydrogen atoms from the material, which hydrogen atoms have the selected characteristics.

There may also be provided apparatus for oxidizing the fluid prior to or following supply thereof to the hydrogen exchanger.

There is also provided in accordance with a preferred embodiment of the invention apparatus for providing a water-based fluid with active hydrogen having selected characteristics comprising a container including an anode and at least one cathode formed of a material having selected characteristics, the container including an inlet for receiving a water based electrolyte, wherein hydrogen atoms are exchanged between the material and the fluid, whereby the fluid receives hydrogen atoms from the material, which hydrogen atoms have the selected characteristics.

Preferably, a plurality of additional cathode assemblies are disposed between the anode and the cathode, each assembly including an anode facing surface formed of a material having selected characteristics and a cathode facing surface formed of carbon.

In accordance with a preferred embodiment of the present invention, the apparatus also comprises a ion permeable, generally water non-permeable membrane separating each of the additional cathode assemblies from each other and from the anode and the cathode, thereby defining separate oxidizing and reducing water pathways in the container.

The present invention also seeks to provide apparatus and methods for reducing the redox potential of substances and various uses of such substances.

It is appreciated that drinking water, especially chlorinated water, has a high concentration of oxidizing OH radicals expressed in high redox potential readings.

The present invention seeks to quench the hydroxyl free radicals by atomic hydrogen, to form water. The atomic hydrogen activity is provided via reducing water.

It is known that the active hydrogen in different antioxidants has different physical properties, such as its magnetic resonance, causing it to have different biological effects. Therefore, the hydrogen coming from a specific substance carries some characteristics of the substance it came from. It is also known that hydrogen atoms of a substance can be exchanged with hydrogen atoms in a solvent, such as water.

It is therefore another object of the present invention to form water in which one or more of the hydrogen atoms are of a predetermined character. In this manner, water can be improved qualitatively and quantitatively.

It is known that air oxidized by ozone, chlorine and the like is toxic to plants. The oxidative potential of the air stems from the formation of hydroxyl radicals upon reaction of the oxidizing matter with the moisture in the air and the water in the plants.

It is therefore another object of the present invention to reduce oxidizing fluids, such as air, by contact with atomic hydrogen or reducing water.

It is also an object of the present invention to provide a vehicle for preventing or slowing harmful oxidation in biological, organic and inorganic systems.

There is thus provided in accordance with a preferred embodiment of the present invention a method for improving water quality including the steps of:
  providing a supply of water to be treated; and
  decreasing the redox potential of the water principally by supplying thereto atomic hydrogen.

Preferably, the step of decreasing the redox potential comprises supplying molecular hydrogen to apparatus operative to convert the molecular hydrogen to atomic hydrogen.

The step of decreasing the redox potential may include the step of electrolysis.

In accordance with a preferred embodiment of the present invention, the step of supplying includes the step of supplying molecular hydrogen to a porous material which is operative to disassociate the molecular hydrogen into atomic hydrogen and to adsorb the atomic hydrogen.

There is also provided, in accordance with a preferred embodiment of the present invention a method for improving water quality including the steps of:
  providing a supply of water to be treated; and
  decreasing the redox potential of the water by electrolysis employing a cathode and an anode, wherein water communicating with the anode and the cathode is not separated.

Additionally in accordance with a preferred embodiment of the present invention there is provided a method for improving water quality including the steps of:
  providing a supply of water to be treated;
  initially oxidizing the water; and
  subsequently reducing the redox potential of the oxidized water.

Further in accordance with a preferred embodiment of the present invention there is provided a method for quenching the oxidizing free radicals of a substance including the steps of:
  providing a supply of electron donors which following electron donation become oxidizers; and
  providing a supply of a material rich in atomic hydrogen activity which immediately bonds with the oxidizers produced by electron donation so as to prevent the build up of a presence of oxidizers.

There is also provided in accordance with a preferred embodiment of the present invention a method for quenching the oxidizing free radicals of a substance including the steps of:
  providing an anti-oxidant which is operative for producing reduction of the substance and which, upon producing reduction does not act as an oxidant.

Preferably the anti-oxidant is atomic hydrogen.

Preferably the porous material comprises a ceramic material, or a sintered material including a catalyst or graphite.

Additionally in accordance with a preferred embodiment of the present invention there is provided a method of improving air quality within an enclosure including the steps of:
  reducing the redox potential of moisture in air to provide reducing air; and
  supplying the reducing air to the enclosure.

Further in accordance with a preferred embodiment of the present invention there is provided a method of improving air quality including the step of quenching oxidizing substances in the air.

Preferably, the step of quenching comprises the step of quenching hydroxyl free radicals in the air.

Additionally in accordance with a preferred embodiment of the present invention there is provided a method of storing produce including the steps of:
  maintaining produce in a controlled atmosphere; and
  reducing the redox potential of the controlled atmosphere.

Further in accordance with a preferred embodiment of the present invention there is provided a method of growing plants including:
  providing water having a redox potential;
  providing a plant;
  reducing the redox potential of the water to produce reduced redox potential water;
  irrigating the plant with the reduced redox potential water.

Preferably the method of growing plants also includes the step of providing a spray of the reduced redox potential water thereby to provide a reduced redox potential atmosphere for the plant.

Additionally in accordance with a preferred embodiment of the present invention there is provided a method of soilless plant growth including the steps of:
  providing water having a redox potential;
  providing a plant;
  reducing the redox potential of the water to produce reduced redox potential water;
  providing the reduced redox potential water to the plant.

Preferably, the step of providing comprises the step of providing a water spray to the plant.

Further in accordance with a preferred embodiment of the present invention there is provided a method of reducing the redox potential of fluids including the steps of:
  reduction of the redox potential of a liquid to produce a reduced redox potential liquid;
  freezing the reduced redox potential liquid to produce frozen reduced redox potential liquid; and
  supplying the frozen reduced redox potential liquid to a fluid for reduction of the redox potential thereof.

Additionally in accordance with a preferred embodiment of the present invention there is provided a method for improving water quality including the steps of:
  killing microorganisms in the water by oxidizing the water; and thereafter reducing the redox potential of the water.

Further in accordance with a preferred embodiment of the present invention there is provided a method of storing produce including the steps of:

provide a supply of water;

increasing the redox potential of part of the supply of water to provide oxidizing water;

reducing the redox potential of another part of the supply of water to provide reducing water;

humidifying air using the reducing water to produce reducing air;

washing produce using the oxidizing water;

thereafter rinsing the produce in the reducing water;

thereafter removing excess reducing water from the produce by directing a flow of the reducing air onto the produce; and thereafter maintaining the produce in a controlled atmosphere containing the reduced air.

Further in accordance with a preferred embodiment of the present invention there is provided a method of disinfecting a liquid including the steps of:

supplying molecular oxygen and hydrogen to the liquid to create an excess of OH radicals for disinfection; and thereafter supplying molecular hydrogen to the liquid to reduce the redox potential thereof.

Additionally in accordance with a preferred embodiment of the invention there is provided a method of operating a spa including the steps of:

heating, disinfecting and reducing the redox potential of water by applying thereto an AC electrical current which produces partial electrolysis thereof; and supplying the heated, disinfected and reduced water to a spa.

Further in accordance with a preferred embodiment of the present invention there is provided a method of providing a fluid with active hydrogen having selected characteristics including the steps of:

supplying hydrogen to a material having selected characteristics; and causing exchange of hydrogen atoms between the material and the fluid, whereby the fluid receives hydrogen atoms from the material, which hydrogen atoms have the selected characteristics.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
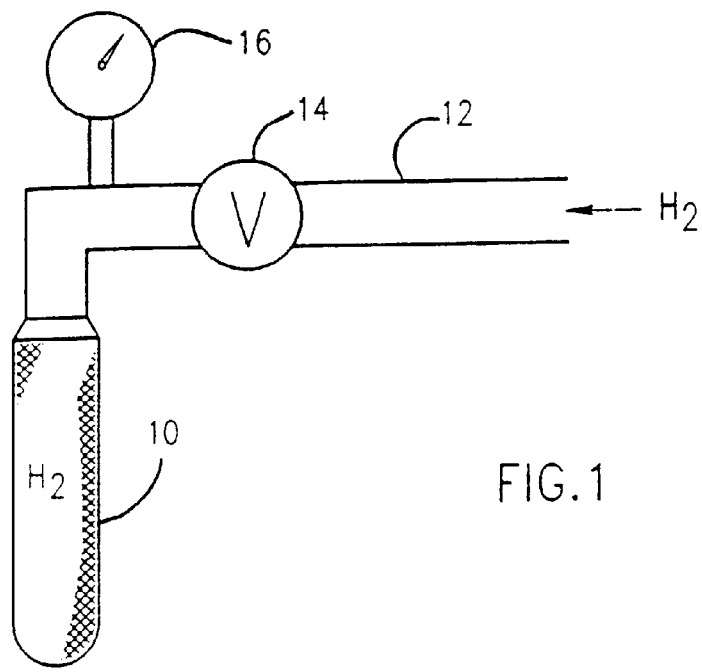
FIG. 1 is a simplified illustration of apparatus for supplying atomic hydrogen to a fluid.

Reference is now made to FIG. 1, which is a simplified illustration of apparatus for supplying atomic hydrogen to a fluid. The apparatus preferably comprises a porous ceramic tube 10, typically formed of alumina and which is commercially available from Coors Ceramic Company of Golden, Colo., under catalog number AL 998-L3. Molecular hydrogen from any suitable source, such as a gas cylinder or an electrolysis device, is supplied to the tube 10, via a conduit 12. A valve 14 and a pressure indicator 16 may be provided along conduit 12.

The porous ceramic tube 10 is preferably operative to prevent substantial diffusion of molecular hydrogen therethrough, thereby retaining pressurized molecular hydrogen therewithin over a relatively long time, even when valve 14 is closed. Atomic hydrogen, however, does become absorbed in pores of the tube 10, communicating with the outer surface thereof.

By causing a fluid, such as a gas, e.g. air, or a liquid, e.g. water or a hydrocarbon fuel, to flow past tube 10, atomic hydrogen is supplied to the fluid, thus reducing the redox potential thereof, i.e. increasing the hydrogen activity of the fluid. Typical reductions of redox potential may be from about +300 mv to −150 mv for water, gasoline and air.

Figure 2:
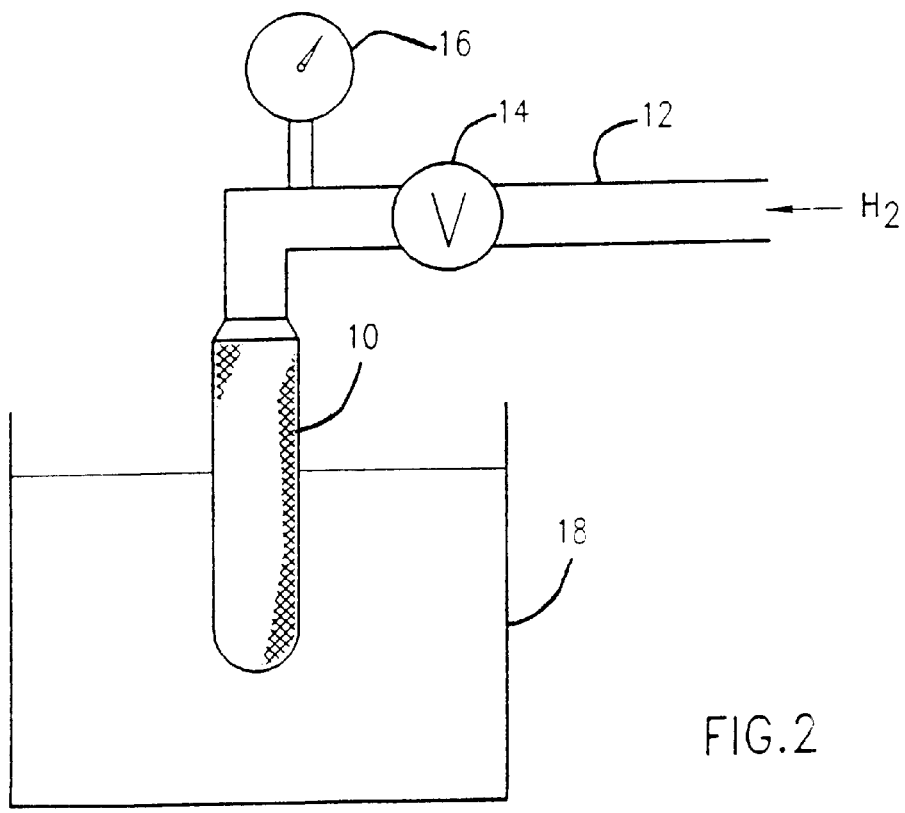
FIG. 2 is a simplified illustration of apparatus for reducing the redox potential of a liquid in accordance with one embodiment of the present invention.

Reference is now made to FIG. 2 which shows the apparatus of FIG. 1 in a bath 18 or conduit of a liquid. The liquid is preferably stirred or otherwise caused to flow past the tube 10, for reducing the redox potential of the liquid in accordance with one embodiment of the present invention.

Figure 3A:
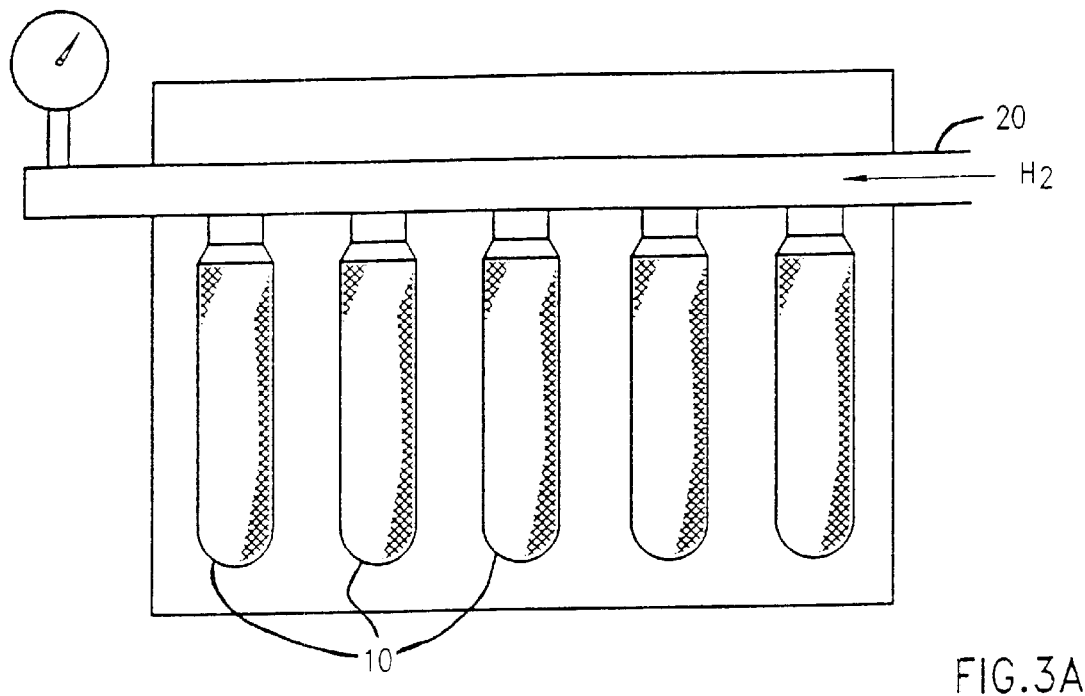
FIGS. 3A and 3B are simplified illustrations of apparatus for reducing the redox potential of a gas in accordance with one embodiment of the present invention.
Figure 3B:
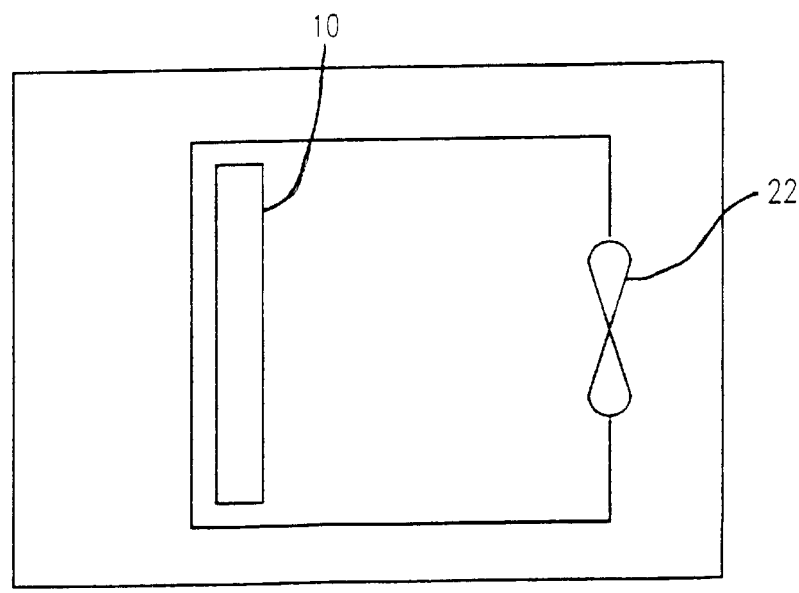

Reference is now made to FIGS. 3A and 3B, which are simplified illustrations of apparatus for reducing the redox potential of a gas in accordance with one embodiment of the present invention. It is seen that a plurality of tubes 10 are associated via a manifold 20 with a source of molecular hydrogen. A fan 22, or any other suitable device is provided for causing the gas to flow past the tubes 10. It is appreciated that the water vapor in the air picks up and reacts with the atomic hydrogen. In effect, the redox potential of the gas is thus reduced by reducing the redox potential of the liquid carried thereby.

Figure 4A:
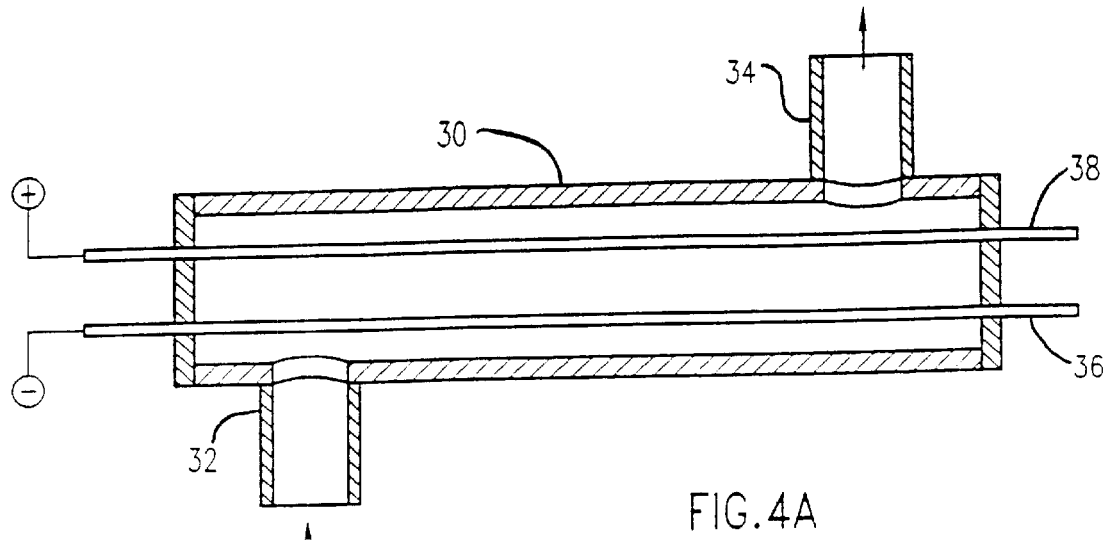
FIGS. 4A and 4B are simplified illustrations of apparatus for reducing the redox potential of a liquid in accordance with another embodiment of the present invention in two different variations.

Reference is now made to FIG. 4A which is a simplified illustration of apparatus for reducing the redox potential of a liquid in accordance with another embodiment of the present invention. A non-conductive housing 30 is provided with a liquid inlet 32 and a liquid outlet 34. A pair of respective negative and positive electrolysis electrodes 36 and 38 are located within the housing. By application of DC voltage across the electrodes 36 and 38, hydrogen is caused to be present on the negative electrode 36. This hydrogen is picked up by the liquid passing through housing 30. Oxygen and chlorine may be present on the positive electrode 38. Generally, the oxygen does not oxidize water. The chlorine strongly oxidizes the water by forming OH radicals. The net result, however, is reduction of the water.

Figure 4B:
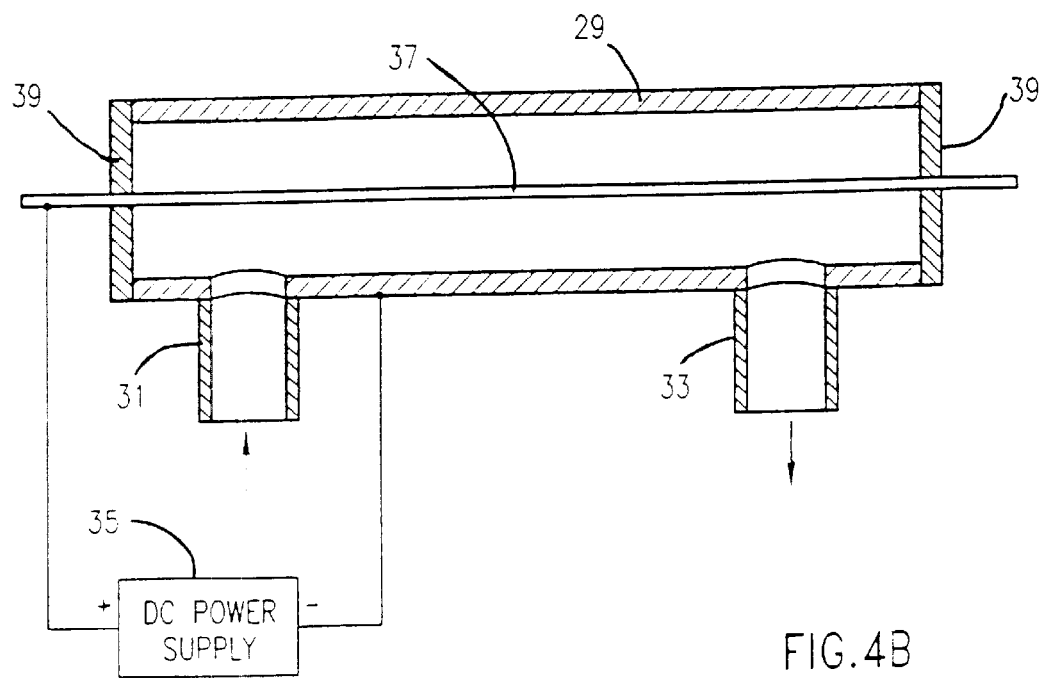

Reference is now made to FIG. 4B which is a simplified illustration of apparatus for reducing the redox potential of a liquid in accordance with yet another embodiment of the present invention. A housing 29 is formed of stainless steel pipe and is associated with a liquid inlet element 31 and a liquid outlet element 33. The housing 29 is coupled to the negative terminal of a DC power supply 35 and serves as a negative electrode.

Disposed preferably concentrically within housing 29 is a stainless steel rod or pipe 37 which is mounted by a pair of insulating mounts 39 and is coupled to the positive terminal of power supply 35. Rod or pipe 37 serves as the positive electrode.

By application of DC voltage across the electrodes 29 and 37, hydrogen is caused to be present on the interior surface of housing 29. This hydrogen is picked up by the liquid passing through housing 29. Oxygen and chlorine may be present on the positive electrode 38. Generally, the oxygen does not oxidize water. The chlorine strongly oxidizes the water by forming OH radicals. The net result, however, is reduced water.

Figure 5:
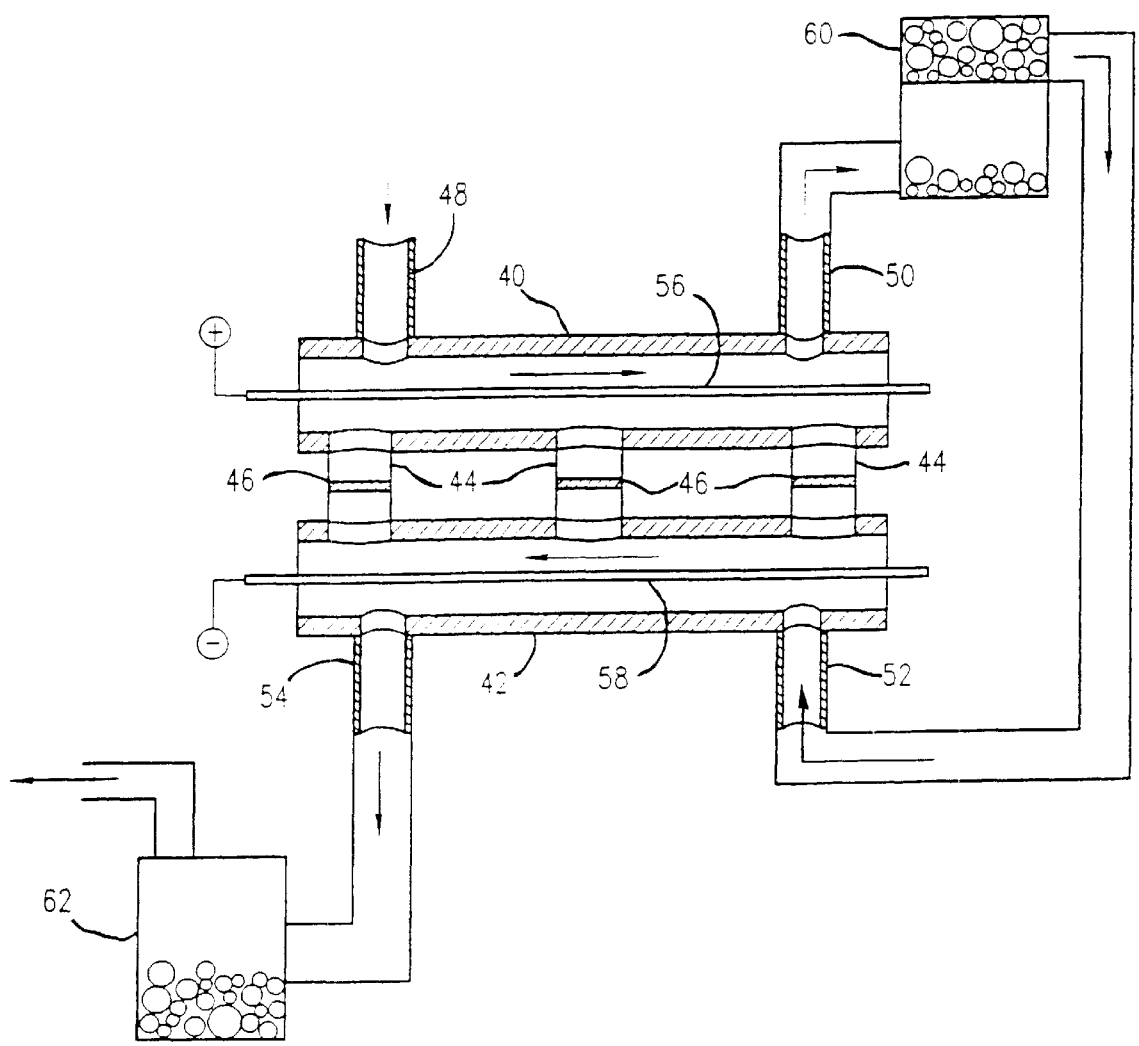
FIG. 5 is a simplified illustration of apparatus for reducing the redox potential of a liquid in accordance with still another embodiment of the present invention, wherein a liquid is first oxidized and then reduced.

Reference is now made to FIG. 5 which is a simplified illustration of apparatus for reducing the redox potential of a liquid in accordance with still another embodiment of the present invention, wherein a liquid is first oxidized and then reduced. The apparatus comprises a pair of non-conducting housings 40 and 42 which are interconnected by a plurality of non-conducting electrochemical bridges 44, each of which may include a porous ceramic barrier 46. Each of housings 40 and 42 includes a liquid inlet and a liquid outlet, indicated respectively by reference numerals 48, 50 and 52, 54. A positive electrolysis electrode 56 is disposed within housing 40, while a negative electrolysis electrode 58 is disposed in housing 42.

The apparatus of FIG. 5, which is particularly suitable for disinfecting water, operates by causing water to enter housing 40 via inlet 48 and to be oxidized by electrode 56. The oxidized water, downstream of electrode 56, is supplied to an oxidation enhancement chamber 60, typically filled with activated carbon and ceramic beads. Chamber 60 provides high surface contact and dwelling time to enable the full oxidation of the water by the oxygen and chlorine produced by the operation of the positive electrode 56 on water, thereby to kill microorganisms therein.

The thus disinfected water is then supplied via inlet 52 to housing 42 wherein it is reduced. The reduced water from housing 42 is provided to a reduction enhancement chamber 62, typically filled with activated carbon and ceramic beads. Chamber 62 provides high surface contact and dwelling time to enable the full reduction of the water.

Figure 6A:
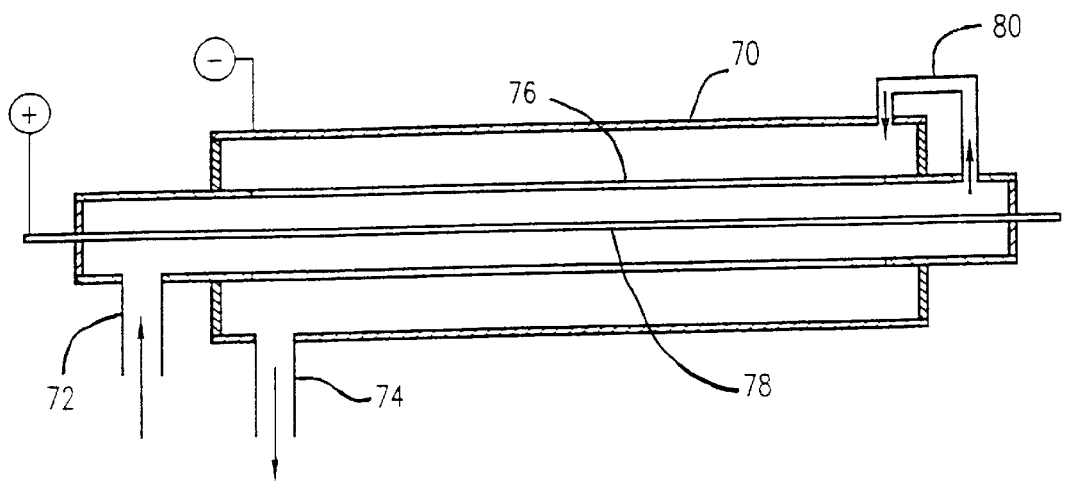
FIG. 6A is a simplified illustration of apparatus for reducing the redox potential of a liquid, wherein a liquid is first oxidized and then reduced in accordance with another embodiment of the invention.

Reference is now made to FIG. 6A which is a simplified illustration of apparatus for reducing the redox potential of a liquid, wherein a liquid is first oxidized and then reduced in accordance with another embodiment of the invention. Here a housing 70 is formed of a conductor, such as stainless steel and defines a negative electrolysis electrode. Housing 70 is formed with a liquid inlet 72 and a liquid outlet 74. Disposed within housing 70 is a tube 76 formed of a porous ceramic material, which may be identical to that used in tube 10 described hereinabove.

A positive electrolysis electrode 78 is disposed interiorly of tube 76, so as to oxidize liquid entering through inlet 72. The oxidized liquid passes along a conduit 80 to the interior of housing 70, outside of tube 76, where it is reduced by hydrogen formed on the interior surface of housing 70, which operates as a negative electrode. Reduced, disinfected liquid, such as water is output at outlet 74. Alternatively, the ceramic tube 76 may be replaced by a fabric hose or similar device, which does not permit significant passage therethrough of liquid but does permit passage therethrough of electrical current.

Figure 6B:
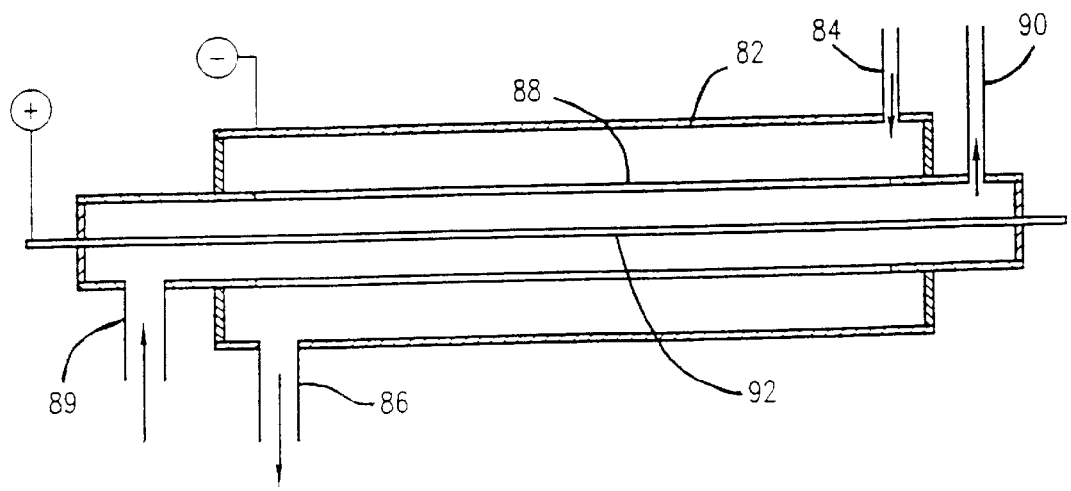
FIG. 6B is a simplified illustration of a variation of the apparatus of FIG. 6A providing separate reducing and oxidizing functions.

Reference is now made to FIG. 6B which is a simplified illustration of a variation of the apparatus of FIG. 6A for reducing the redox potential of a liquid, wherein a liquid is first oxidized and then reduced in accordance with another embodiment of the invention. Here a housing 82 is formed of a conductor, such as stainless steel, and defines a negative electrolysis electrode. Housing 82 is formed with a liquid inlet 84 and a reduced cathodic liquid outlet 86. Disposed within housing 82 is a tube 88 formed of a porous ceramic material, which may be identical to that used in tube 10 described hereinabove. Tube 88 is formed with a liquid inlet 89 and an anodic water outlet 90.

A positive electrolysis electrode 92 is disposed interiorly of tube 88, so as to oxidize liquid entering through inlet 89. The oxidized liquid passes out through outlet 90. Liquid entering via inlet 84 is reduced by hydrogen formed on the interior surface of housing 82, which operates as a negative electrode. Reduced, cathodic liquid, such as water, is output at outlet 86. Alternatively, the ceramic tube 88 may be replaced by a fabric hose or similar device, which does not permit significant passage therethrough of liquid but does permit passage therethrough of electrical current.

Figure 7:
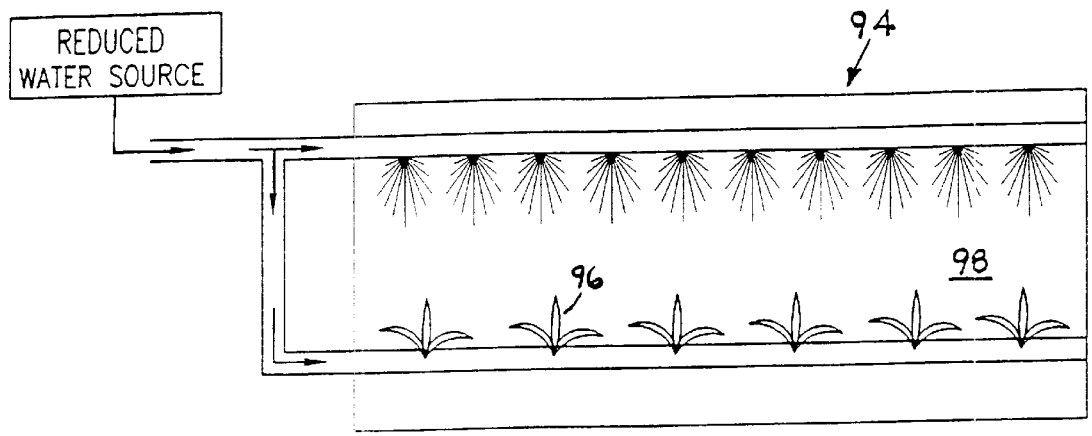
FIG. 7 is a simplified illustration of an enclosure including apparatus for reducing the redox potential of the interior atmosphere thereof in accordance with an alternative embodiment of the present invention.

Reference is now made to FIG. 7 which is a simplified illustration of a growing enclosure 94 including apparatus for reducing the redox potential of the interior atmosphere 98 thereof in accordance with an alternative embodiment of the present invention. It is seen that reducing water is employed not only for watering the plants 94, but also for spraying in the air, so as to reduce the redox potential of the interior atmosphere of the growing enclosure.

Figure 8:
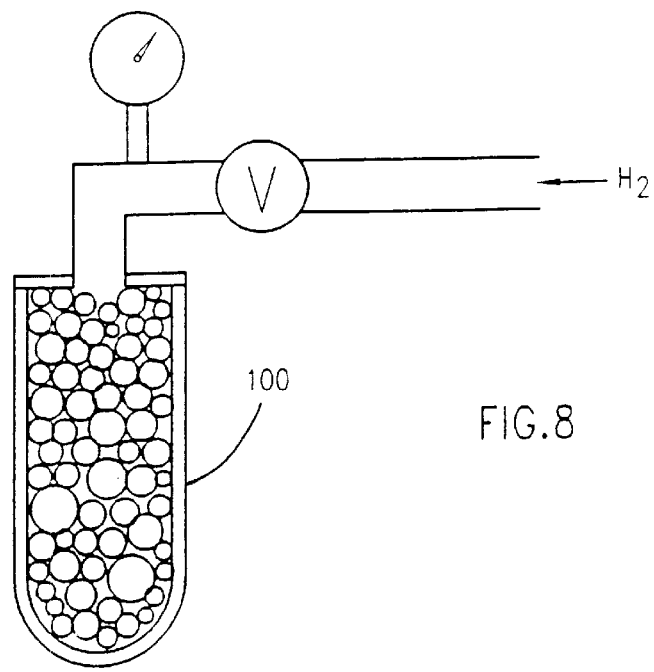
FIG. 8 is a simplified illustration of apparatus for producing fluids with characteristic hydrogen.

Reference is now made to FIG. 8 which is a simplified illustration of apparatus for characterizing hydrogen. Hydrogen is supplied to a container 100 typically formed of a porous ceramic material, such as that employed for tubes 10, described hereinabove. Alternatively tubes 10 and/or container 100 may be made of metal through which it can be shown that hydrogen diffuses. Disposed within container 100 is preferably a finely divided material, preferably an organic material or other active material which is a hydrogen donor, whose characteristics it is sought to obtain in atomic hydrogen. Hydrogen supplied to container 100 is exchanged with the hydrogen of the material contained in container 100 and the exchanged atomic hydrogen of the material collects on the outer surface of the container 100, so as to be able to be picked up by fluid, such as gas, or air, flowing therepast. The exchanged atomic hydrogen has characteristics of the material from which it was received, and thus, in effect contains information.

Figure 9:
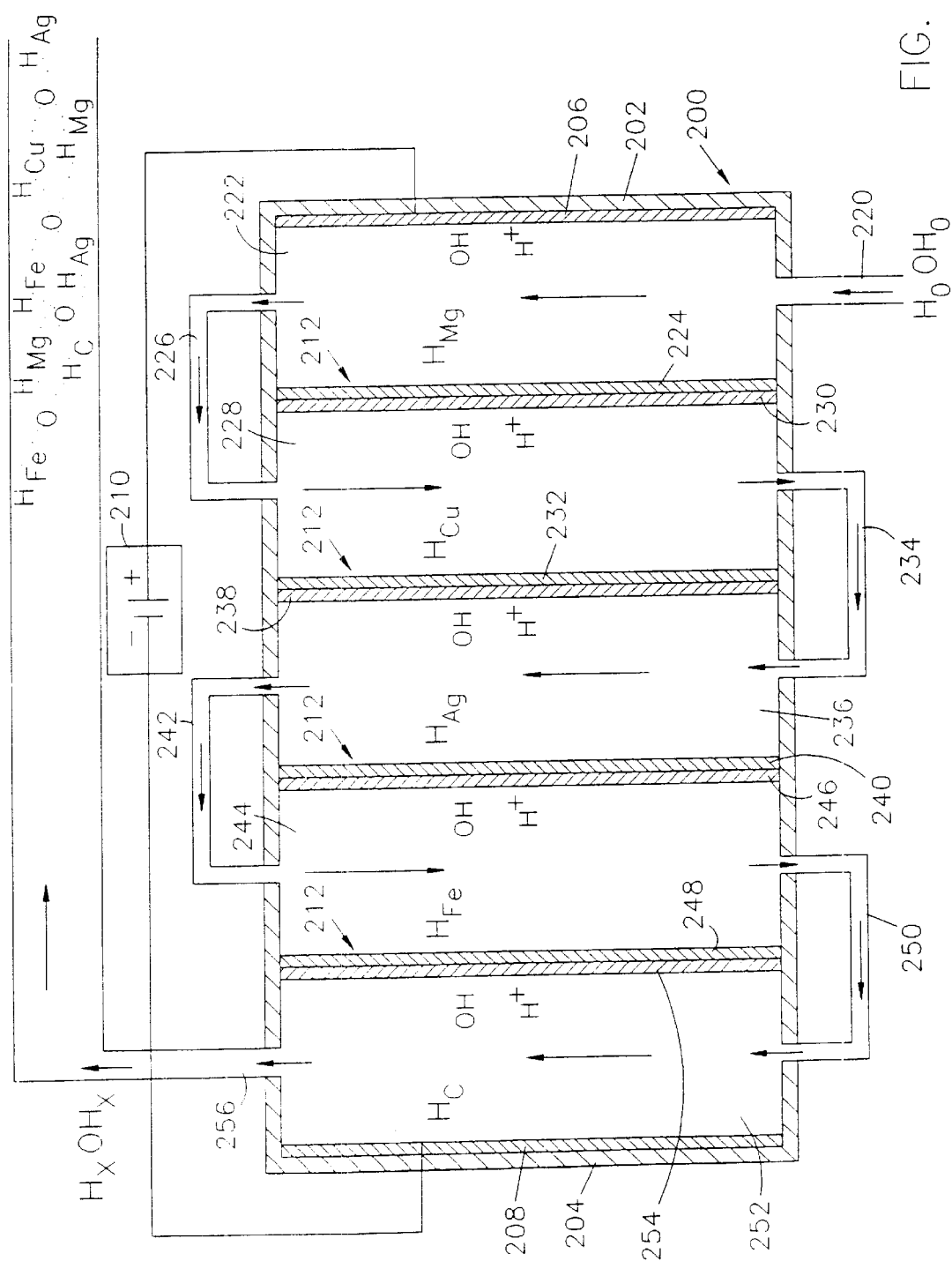
FIG. 9 is a simplified sectional illustration of a multi-electrode water treatment facility constructed and operative in accordance with one preferred embodiment of the present invention.

Reference is now made to FIG. 9 which is a simplified sectional illustration of a multi-electrode water treatment facility constructed and operative in accordance with one preferred embodiment of the present invention. The water treatment facility comprises a container 200, preferably formed of a non-electrically conductive material or coated with such a material, typically having a generally rectangular configuration and defining two opposite ends 202 and 204.

Adjacent ends 202 and 204 there are preferably formed an anode 206 and a cathode 208 respectively. Anode 206 and cathode 208 are preferably formed of carbon, such as graphite. Alternatively the anode and cathode may be formed of any other suitable electrically conductive material, such as platinum or gold, which is not soluble under electrolysis.

A battery or other source of DC voltage 210 is connected across anode 206 and cathode 208 as illustrated.

In accordance with a preferred embodiment of the present invention a plurality of auxiliary electrode assemblies 212, preferably having a carbon surface facing cathode 208 and a surface of a selected metal facing anode 206, are provided in mutually spaced relationship between anode 206 and cathode 208 in container 200, thus dividing the container as illustrated.

In accordance with a preferred embodiment of the present invention, the plurality of auxiliary electrode assemblies includes electrode assemblies 212 having anode-facing surfaces of different metals, such as for example, Magnesium, Copper, Silver and Iron. The selection of metals is preferably in accordance with desired properties of such metals which it is intended to impart to water in accordance with a preferred embodiment of the present invention.

A supply of water, such as ordinary tap or well water, or alternatively any water based liquid having electrical conductivity is supplied to container 200 via an inlet 220. The water initially passes through a passageway 222 between anode 206 and a magnesium anode-facing electrode surface 224, functioning as a cathode. Thereafter, the water passes via a conduit 226 to a passageway 228 between a carbon cathode-facing electrode surface 230, functioning as a anode and a copper anode-facing electrode surface 232, functioning as a cathode. Thereafter, the water passes via a conduit 234 to a passageway 236 between a carbon cathode-facing electrode surface 238, functioning as a anode and a silver anode-facing electrode surface 240, functioning as a cathode. Thereafter, the water passes via a conduit 242 to a passageway 244 between a carbon cathode-facing electrode surface 246, functioning as a anode, and an iron anode-facing electrode surface 248, functioning as a cathode. Thereafter, the water passes via a conduit 250 to a passageway 252 between a carbon cathode-facing electrode surface 254, functioning as a anode and cathode 208. Water exits passageway 252 via an outlet 256.

In accordance with a preferred embodiment of the present invention, as the water passes through the treatment facility some of the hydrogen atoms in the water become substituted by hydrogen atoms which originated on the various metal anode-facing surfaces. In accordance with a preferred embodiment of the invention, this substitution imparts to the water certain characteristics of the respective metals of such surfaces. It is a particular feature of the invention that the characteristics of the various metals are imparted to the water without requiring that any metal atoms or ions enter the water or become dissolved therein.

It is appreciated that any suitable number of auxiliary electrode assemblies may be employed. They may be electrically floating or alternatively coupled to battery 210 and may be formed with surfaces of any suitable metal.

Figure 10:
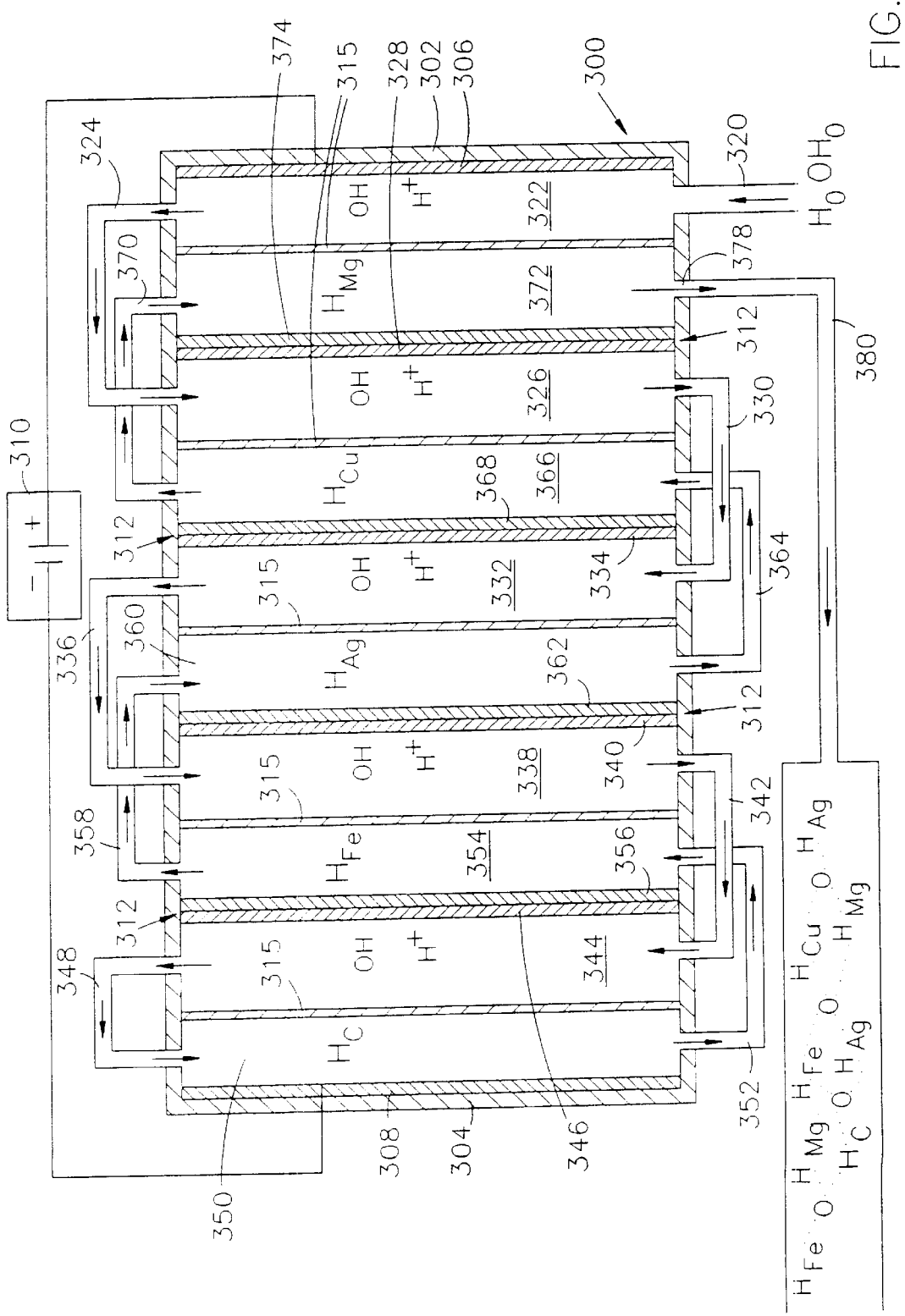
FIG. 10 is a simplified sectional illustration of a multi-electrode water treatment facility constructed and operative in accordance with another preferred embodiment of the present invention.

Reference is now made to FIG. 10 which is a simplified sectional illustration of a multi-electrode water treatment facility constructed and operative in accordance with another preferred embodiment of the present invention. The facility of FIG. 10 is operative initially to oxidize and thereafter to reduce water passing therethrough, as distinguished from the facility of FIG. 9, which only produces a reduced water output.

The water treatment facility of FIG. 10 comprises a container 300, preferably formed of a non-electrically conductive material or coated with such a material, typically having a generally rectangular configuration and defining two opposite ends 302 and 304.

Adjacent ends 302 and 304 there are preferably formed an anode 306 and a cathode 308 respectively. Anode 306 and cathode 308 are preferably formed of carbon, such as graphite. Alternatively the anode and cathode may be formed of any other suitable electrically conductive material, such as platinum or gold, which is not soluble under electrolysis.

A battery or other source of DC voltage 310 is connected across anode 306 and cathode 308 as illustrated.

In accordance with a preferred embodiment of the present invention a plurality of auxiliary electrode assemblies 312, preferably having a carbon surface facing cathode 308 and a surface of a selected metal facing anode 306, are provided in mutually spaced relationship between anode 306 and cathode 308 in container 300, thus dividing the container as illustrated.

Further in accordance with a preferred embodiment of the present invention, each of the auxiliary electrode assemblies 312 is separated from the electrode or electrode assemblies adjacent thereto by a non-electrically conductive membrane 315 which permits passage of ions but does not generally permit passage of water. A typical membrane which is suitable for this purpose is a thin porous ceramic plate or a cloth, having openings sufficiently small so as to greatly restrict the amount of liquid passing therethrough.

In accordance with a preferred embodiment of the present invention, the plurality of auxiliary electrode assemblies includes electrode assemblies 312 having anode-facing surfaces of different metals, such as for example, Magnesium, Copper, Silver and Iron. The selection of metals is preferably in accordance with desired properties of such metals which it is intended to impart to water in accordance with a preferred embodiment of the present invention.

A supply of water, such as ordinary tap or well water, or alternatively any water based liquid having electrical conductivity, is supplied to container 300 via an inlet 320. The water initially passes through a passageway 322 between anode 306 and a membrane 315. Thereafter, the water passes through a conduit 324 to a passageway 326 between a carbon cathode-facing electrode surface 328, functioning as a anode and another membrane 315. Thereafter, the water passes through a conduit 330 to a passageway 332 between a carbon cathode-facing electrode surface 334, functioning as a anode and yet another membrane 315. Thereafter, the water passes through a conduit 336 to a passageway 338 between a carbon cathode-facing electrode surface 340, functioning as a anode, and still another membrane 315. Thereafter, the water passes through a conduit 342 to a passageway 344 between a carbon cathode-facing electrode surface 346, functioning as a anode, and a further membrane 315. At this point the water is oxidized and sterilized.

Following the above-described oxidation step, the water passes through a reducing process, much like that described hereinabove in connection with FIG. 9. The water passes through a conduit 348 to a passageway 350 between the cathode 308 and the same further membrane 315, mentioned above. From passageway 350, the water passes via a conduit 352 to a passageway 354 between a membrane 315 and an iron anode-facing electrode surface 356, functioning as a cathode. On the opposite side of the membrane there is present carbon cathode-facing electrode surface 340, functioning as an anode.

Thereafter, the water passes via a conduit 358 to a passageway 360 between a membrane 315, on the opposite side of which there is disposed carbon cathode-facing electrode surface 334 functioning as a anode, and a silver anode-facing electrode surface 362, functioning as a cathode. Thereafter, the water passes via a conduit 364 to a passageway 366 between a membrane 315, on the opposite side of which there is disposed a carbon cathode-facing electrode surface 328 functioning as a anode, and a copper anode-facing electrode surface 368, functioning as a cathode.

Thereafter, the water passes via a conduit 370 to a passageway 372 between a membrane 315, on the opposite side of which is disposed anode 306, and a magnesium anode-facing electrode surface 374, functioning as a cathode. From passageway 372, the oxidized and subsequently reduced water passes to an outlet 378 and into conduit 380.

As in the embodiment of FIG. 9, as the water passes through the reducing path of the treatment facility some of the hydrogen atoms in the water become substituted by hydrogen atoms which originated on the various metal anode-facing surfaces. In accordance with a preferred embodiment of the invention, this substitution imparts to the water certain characteristics of the respective metals of such surfaces. It is a particular feature of the invention that the characteristics of the various metals are imparted to the water without requiring that any metal atoms or ions enter the water or become dissolved therein.

Figure 11:
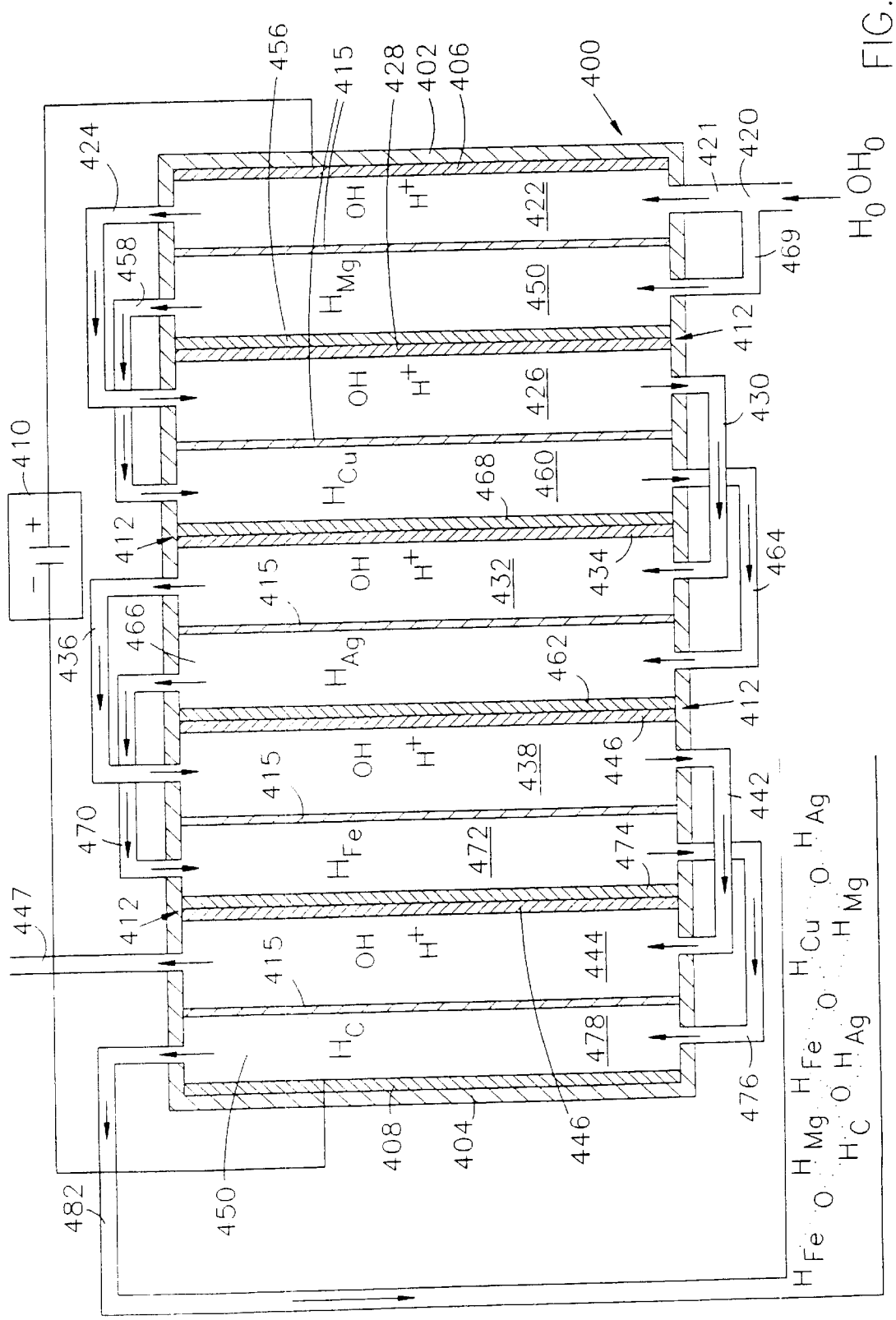
FIG. 11 is a simplified sectional illustration of a multi-electrode water treatment facility constructed and operative in accordance with yet another preferred embodiment of the present invention.

Reference is now made to FIG. 11 which is a simplified sectional illustration of a multi-electrode water treatment facility constructed and operative in accordance with a further preferred embodiment of the present invention. The facility of FIG. 11 is operative simultaneously to oxidize and to reduce water passing therethrough in parallel streams.

The water treatment facility of FIG. 11 is similar to that of FIG. 10 in that it comprises a container 400, preferably formed of a non-electrically conductive material or coated with such a material, typically having a generally rectangular configuration and defining two opposite ends 402 and 404.

Adjacent ends 402 and 404 there are preferably formed an anode 406 and a cathode 408 respectively. Anode 406 and cathode 408 are preferably formed of carbon, such as graphite. Alternatively the anode and cathode may be formed of any other suitable electrically conductive material, such as platinum or gold, which is not soluble under electrolysis.

A battery or other source of DC voltage 410 is connected across anode 406 and cathode 408 as illustrated.

In accordance with a preferred embodiment of the present invention a plurality of auxiliary electrode assemblies 412, preferably having a carbon surface facing cathode 408 and a surface of a selected metal facing anode 406, are provided in mutually spaced relationship between anode 406 and cathode 408 in container 400, thus dividing the container as illustrated.

Further in accordance with a preferred embodiment of the present invention, each of the auxiliary electrode assemblies 412 is separated from the electrode or electrode assemblies adjacent thereto by a non-electrically conductive membrane 415 which permits passage of ions but does not generally permit passage of water. A typical membrane which is suitable for this purpose is a thin porous ceramic plate or a cloth, having openings sufficiently small so as to greatly restrict the amount of liquid passing therethrough.

In accordance with a preferred embodiment of the present invention, the plurality of auxiliary electrode assemblies includes electrode assemblies 412 having anode-facing surfaces of different metals, such as for example, Magnesium, Copper, Silver and Iron. The selection of metals is preferably in accordance with desired properties of such metals which it is intended to impart to water in accordance with a preferred embodiment of the present invention.

A supply of water, such as ordinary tap or well water, or alternatively any water based liquid having electrical conductivity, is supplied to container 400 via a bifurcating inlet 420. One branch 421 of the inlet directs part of the water initially through a passageway 422 between anode 406 and a membrane 415. Thereafter, the water passes through a conduit 424 to a passageway 426 between a carbon cathode-facing electrode surface 428, functioning as a anode, and another membrane 415.

Thereafter, the water passes through a conduit 430 to a passageway 432 between a carbon cathode-facing electrode surface 434, functioning as a anode, and yet another membrane 415. Thereafter, the water passes through a conduit 436 to a passageway 438 between a carbon cathode-facing electrode surface 440, functioning as a anode, and still another membrane 415. Thereafter, the water passes through a conduit 442 to a passageway 444 between a carbon cathode-facing electrode surface 446, functioning as a anode, and a further membrane 415. At this point the water is oxidized and sterilized and is supplied at an outlet 448 and into conduit 447.

A second branch 449 of inlet 420 leads another part of the water through a reducing process, much like that described hereinabove in connection with FIG. 9. The water passes through a passageway 450 between a membrane 415 and a copper aniode-facing electrode surface 456, functioning as a cathode. On the opposite side of the membrane is disposed anode 406.

Thereafter, the water passes via a conduit 458 to a passageway 460 between a membrane 415, on the opposite side of which there is disposed carbon cathode-facing electrode surface 428 functioning as an anode, and a magnesium anode-facing electrode surface 462, functioning as a cathode. Thereafter, the water passes via a conduit 464 to a passageway 466 between a membrane 415, on the opposite side of which there is disposed carbon cathode-facing electrode surface 434 functioning as a anode, and an iron anode-facing electrode surface 468, functioning as a cathode.

Thereafter, the water passes via a conduit 470 to a passageway 472 between a membrane 415, on the opposite side of which is disposed carbon cathode-facing electrode surface 440 functioning as a anode, and a silver anode-facing electrode surface 474, functioning as a cathode.

Thereafter, the water passes via a conduit 476 to a passageway 478 between a membrane 415, on the opposite side of which is disposed carbon cathode-facing electrode surface 446 functioning as a anode, and cathode 408. From passageway 478 the reduced water passes to an outlet 480 and into conduit 482.

As in the embodiment of FIG. 9, as the water passes through the reducing path of the treatment facility some of the hydrogen atoms in the water become substituted by hydrogen atoms which originated on the various metal anode-facing surfaces. In accordance with a preferred embodiment of the invention, this substitution imparts to the water certain characteristics of the respective metals of such surfaces. It is a particular feature of the invention that the characteristics of the various metals are imparted to the water without requiring that any metal atoms or ions enter the water or become dissolved therein.

Figure 12:
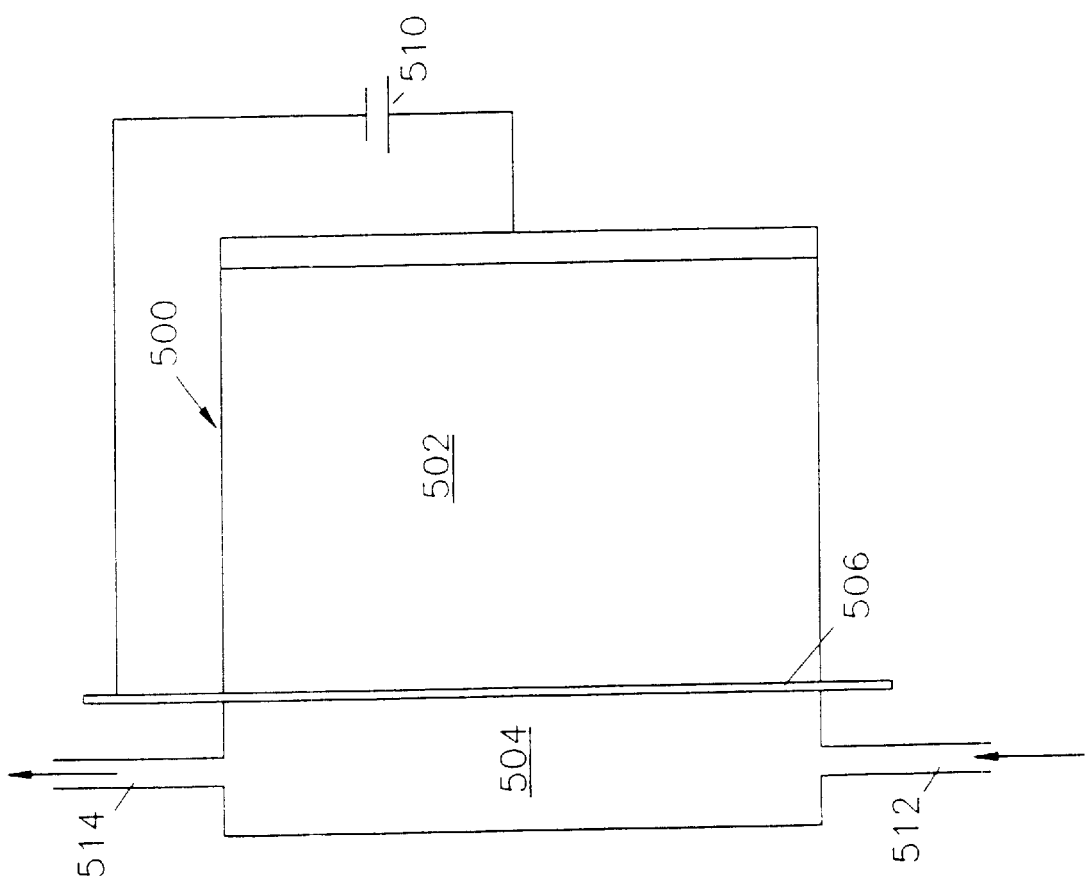
FIG. 12 is a simplified of a water treatment facility constructed and operative in accordance with still another preferred embodiment of the present invention.

Reference is now made to FIG. 12 which illustrates a water treatment facility constructed and operative in accordance with yet another preferred embodiment of the present invention. The facility comprises a container 500 which is divided into two chambers 502 and 504 by a hydrogen permeable, otherwise non-permeable barrier 506, which functions as a cathode. Barrier 506 may comprise a metal plate or a barrier of any suitable substance, such as an alloy, which contains metal and other elements. It is appreciated by applicant that hydrogen permeates through metal, which is not otherwise permeable.

An anode 508 is disposed adjacent one wall of the container 500 opposite cathode 506 at an opposite side therefrom in chamber 502 and is electrically coupled to the cathode by via a battery or other voltage source 510. Chamber 504 is provided with a water inlet 512 and a water outlet 514 for circulation of water therethrough.

In accordance with a preferred embodiment of the present invention, an electrolyte fills chamber 502 and hydrogen having the characteristics of the elements making up the electrolyte and/or of the metal forming the cathode 506 diffuses through the metal barrier 506 to the face thereof which is in contact with water flowing through chamber 504. The hydrogen atoms appearing on that face of the barrier 506 are exchanged with hydrogen atoms making up the water and thus enter the water and cause the water to have those characteristics.

The transfer of hydrogen having the characteristics of the elements making up the electrolyte and/or of the metal forming the cathode 506 to the water may be enhanced by first oxidizing the water prior to supplying it to chamber 504, such as by using the facility of FIG. 11.

It is appreciated that the facility described above is operative to introduce hydrogen of desired characteristics into any suitable water based solution as well as to distilled water having substantially no impurities.

A number of examples of the invention will now be described:

EXAMPLE I
Stress Tomato Plants

Two sets of four trays of tomato plants were grown in a greenhouse in Patterson, Calif. The control tray was irrigated with well water whose measured redox potential was between 270 and 300 mv, while the test tray was irrigated with the same well water which had been treated using reducing equipment of the type illustrated in FIG. 4B. The measured redox potential of the test irrigation water was about 50 mv.

Both trays were not irrigated for three days. The lack of irrigation resulted in dehydration and browning of the plants in the control tray but did not result in browning or visible stress in the test plants.

EXAMPLE II
Stressed Cauliflower Plants

Eight trays of cauliflower plants were grown in a greenhouse in Patterson, Calif. The control trays were irrigated with well water whose measured redox potential was between 270 and 300 mv, while the test trays were irrigated with the same well water which had been treated using reducing equipment of the type illustrated in FIG. 4B. The measured redox potential of the test irrigation water was about 50 mv. Both groups of trays grew normally for about three months and appeared to be identical.

Both sets of trays were not irrigated for three days. The lack of irrigation resulted in dehydration and browning of the plants in both the control trays and the test trays. Irrigation was then resumed as before. Most of the plants in the test trays returned nearly to their previous normal state, but none of the plants in the control trays revived.

EXAMPLE III
High Salinity Stress Celery Plants

Two identical beds of celery plants, each about 100 feet long and 12 feet wide and containing hundreds of thousands of plants, were grown in a greenhouse in Salinas, Calif. The control plants were irrigated with well water whose measured redox potential was between 270 and 300 mv, while the test plants were irrigated with the same well water which had been treated using reducing equipment of the type illustrated in FIG. 4B. The measured redox potential of the test irrigation water was about 50 mv.

Both groups of plants grew normally for about 6 weeks until salinity stress was noticed in the control plants. The salinity stress was expressed in yellowing of the control plants and damage to the roots of the control plants. No corresponding salinity stress was noticed in the test plants.

EXAMPLE IV
Growth and Vitality Cauliflower Plants

Four trays of cauliflower plants were grown outdoors in Patterson, Calif. The control trays were irrigated with well water whose measured redox potential was between 270 and 300 mv, while the test trays were irrigated with the same well water which had been treated by boiling for two minutes and subsequent cooling to ambient temperature. The measured redox potential of the test irrigation water was about 100 mv. Both groups of trays grew normally for about one month and appeared to be identical.

Thereafter the control plants began to show signs of fatigue, loss of color, and susceptibility to attack by pests. The test plants did not show such fatigue or loss of color and showed less susceptibility to attack by pests.

EXAMPLE V
Growth and Vitality Tomato Plants

Forty acres of tomato plants were grown in Five Points, Calif. Thirty-nine of the forty acres were irrigated with water whose measured redox potential was about 310 mv, while a control acre was irrigated with the same water which had been treated using reducing equipment of the type illustrated in FIG. 4B. The measured redox potential of the test irrigation water was about 45 mv. All plants were seeded in January, 1993. Irrigation began in April and proceeded for 8 hours once a week. Plants were harvested on Jul. 16, 1993.

Samples of fruit bearing plants were selected from both the control and the test acreage during harvest. The test plants were larger and heavier than the control plants. Although the number of tomatoes per plant was about the same for the control and test plants, the weight of the tomatoes in the test group was about 40% higher than that for the control group. The solid content, pH and other quality parameters were the same in both groups.

EXAMPLE VI
Reduction of Water by Electrolysis

Well water at Patterson, Calif., having a redox potential of 312 mv was supplied to apparatus of the type illustrated in FIG. 4B at a rate of about 5 gallons per minute. The current was 20 Ampere and the voltage was 16 Volts. The water output had a measured redox potential of 45 mv. This water was supplied to a spa and was circulated therethrough and was also employed for irrigation.

EXAMPLE VII
Reduction of Water by Electrolysis

Well water at Patterson, Calif., having a redox potential of 312 mv was supplied to apparatus of the type illustrated in FIG. 4B at a rate of about 5 gallons per minute. AC current was employed at 220 Volt. The water output had a measured redox potential of 45 mv. Operation of the apparatus of FIG. 4B using AC current provided heating of the water and disinfection thereof in addition to the reduction of the redox potential thereof. This water was supplied to a spa and was circulated therethrough and through the apparatus of FIG. 4B.

EXAMPLE VIII
Reduction of Water by Electrolysis

Well water at Patterson, Calif., having a redox potential of 270 mv was supplied to apparatus of the type illustrated in FIG. 6A at a rate of about 1 gallon per minute. DC current was employed at 2 Amperes and a titanium electrode 78 was employed.

The water output had a measured redox potential of −50 mv.

EXAMPLE IX
Reduction of Water by Electrolysis

Well water at Patterson, Calif., having a redox potential of 270 mv was supplied to apparatus of the type illustrated in FIG. 6B at a rate of about 1 gallon per minute. DC current was employed at 2 Amperes and a titanium electrode 92 was employed.

The water output at outlet 86 had a measured redox potential of 350 mv. The water output at outlet 90 had a measured redox potential of −460 mv.

EXAMPLE X
Dechlorination and Reduction of Water by Electrolysis

Well water at Patterson, Calif., having a redox potential of 270 mv was chlorinated with commercial chlorine solution. The redox potential of the chlorinated water was 690 mv. The chlorinated water was supplied to apparatus of the type illustrated in FIG. 6A at a rate of about 1 gallon per minute. DC current was employed at 2 Amperes and a titanium electrode 78 was employed.

The water output had a measured redox potential of 640 mv. This output was passed through an 8 inch long tube containing active carbon. The water output from the tube had a measured redox potential of −50 mv.

EXAMPLE XI
Ice Cubes of Reducing Water

Hydrogen gas was bubbled into tap water using a sparger for about one minute. The measured redox potential of the tap water was reduced thereby from 295 mv to −50 mv. The thus reduced water was frozen into ice cubes and used subsequently in a variety of drinks. Melting of the ice cubes greatly reduced the redox potential of the drinks.

EXAMPLE XII
Reducing Water Using Ceramic Tube

Hydrogen was supplied under a pressure of 30 psi to a ceramic tube as illustrated in FIG. 2. Water was provided at a redox potential of 285 mv. Upon agitating the ceramic tube in the water, the redox potential of the water dropped to 85 mv.

EXAMPLE XIII
Transfer of Characteristics of Hydrogen

One gram of dry black pepper powder is placed in a ceramic tube as illustrated in FIG. 2. Hydrogen gas was supplied to the interior of the tube at a pressure of 25 psi. The water outside of the ceramic tube became slightly discolored and had a slight taste of pepper.

Part of the ceramic tube was left above the water line. Brown colored liquid droplets having a strong taste of pepper were found on the outer surface of the ceramic tube above the water line.

A control experiment identical to the foregoing but using nitrogen gas instead of hydrogen gas, produced none of the observed results.

EXAMPLE XIV
Enhancement of Hydrocarbon Fuel

Hydrogen was sparged into regular unleaded gasoline. The redox potential of the gasoline was reduced from about 300 mv to −150 mv. This gasoline was employed in a lawnmower and an automobile and appeared to provide easier starting and more powerful operation.

EXAMPLE XV
Irrigation of Tomato Plants

One control row of tomatoes was irrigated with well water. Three additional rows were irrigated with well water after the prices of reduction. The reducing process was performed by two different treatment devices. One device was constructed from a steel tube, serving as a cathode; the cathode of the second device was made of stainless steel. The row irrigated by the reduced water flowing over the steel cathode exhibited faster growth than the control row. The plants irrigated by water reduced over a stainless steel cathode exhibited very poor growth as compared to the control row.

Thus, it may be concluded that not only the reduction enhances the growth but that the characteristics of the hydrogen may have a positive or a negative effect on the growth.

Experiments to study fungicidal, pesticidal and herbicidal effects of water composed of hydrogen of different specificity and characteristics are being undertaken. These experiments were initiated in view of the fact that proven materials contain specific elements.

EXAMPLE XVI
Examples of Use of Apparatus of FIGS. 9 and 10

Water was reduced electrochemically in a rectangular container having an anode and cathode spaced 15 cm apart. The voltage was 30 volts and the current was 0.2 amps. Both electrodes were made of steel. Hydrogen evolved from the cathode and the iron electrode dissolved on the anode. Placing a flat steel sheet of the same dimensions as of the electrodes in the middle of the container did not effect the current and the voltage. The steel sheet was releasing hydrogen on the side facing the anode and iron dissolution was observed on the side facing the cathode. The amount of hydrogen on the cathode and electrically floating sheet appeared to be the same. The reduction of the water was enhanced. Placing four sheets of steel in the water between the anode and the cathode caused hydrogen evolution to appear on all the sheets to the same degree as that on the sides facing the anode. The water was reduced in a much shorter time than that in previous experiment with the single steel plate. The amount of iron dissolution increased correspondingly.

It was therefore concluded that the device in FIG. 9 will reduce the water at a very fast rate and at low power demands. Additionally, using different metals for cathodes, hydrogen of multiple characteristics will be formed in the water.

In order to oxidize the water for the purposes of sterilization, the anode passageway was separated from the cathode passageway, as illustrated in FIG. 11. The oxidization, as expressed in the redox potential, of the water after passing through the anode passageways was very efficient in comparison to the results obtained in the device illustrated in FIG. 5.

EXAMPLE XVII
Examples of the Use of Apparatus of FIG. 12

Using a steel cathode and sulfuric acid as the electrolyte, the steel blistered after a few hours. Using hydrochloric acid, under the same conditions, did not lead to blistering of the steel. Thus, it was concluded that the composition of the electrolyte has an effect on hydrogen permeability through the metal. It appears that the similarity of the elements in the electrolyte and the cathode has an effect on hydrogen permeability in the metal. Experiments are now being conducted to study the rate of reduction of the water in contact with the rearside of the cathode and the characteristics of the hydrogen in relation with the cathode material and the composition of the electrolyte.

EXAMPLE XVIII
Example of Use of Apparatus of FIG. 8

A drop of perfume was placed in the porous ceramic container which was filled with calcined carbon granules. After evacuation of the air, the tube was connected to a hydrogen gas cylinder and pressurized with hydrogen gas to a pressure of approximately 2 atms. After a few minutes an aroma of perfume was emanating from the tube. The tube was placed in water. No gas sparging was observed. The redox potential of the water was reduced.

After about 10 minutes the water had an aroma of perfume. The water retained the aroma for more than two weeks. The tube has been emanating the aroma for more than a month at the same intensity. When the tube was placed in either glycerin or alcohol no aroma of the perfume was detected. This led to the conclusion that the hydrogen loses its characteristic properties in these non-aqueous liquids. These experiments also prove that the molecules of the aroma material do not permeate through the ceramic tube and that the aroma is sensed through the characteristic hydrogen formed by the exchange process and permeating through the wall of the tube.

EXAMPLE XIX
Further Example to the Use of Apparatus of FIG. 5

Three fish tanks containing well water were inhabited with small ornamental fish. One tank was maintained as the control tank. The water in the second tank was circulated through the anodic compartment of the device described in FIG. 5. The initial redox potential was 230 mv. After circulating and oxidizing the water for a few minutes the fish appeared to become sick; some were even lying on their sides at the bottom of the tank. The redox potential was measured to be 350 mv. When the potential reached a value of about 500 mv some of the fish died. Upon reduction of the water to a potential of about 100 mv the surviving fish resumed normal activity.

The redox potential of the water in the third tank was reduced to value of –250 mv. The reduced potential appeared to have no effects on the activity of the fish.

EXAMPLE XX
Further Example to the Use of Apparatus of FIG. 5

Tap water at different redox potentials was used for bread making. No additives such as the commonly used, such as potassium bromate and gluten were added to the dough. The control water at a redox potential of about 500 mv did not yield satisfactory bread, in respect to size, color and texture. The water oxidized to a potential of about 600 mv yielded flat bread. Water reduced to a redox potential of about 50 mv yielded a bread of larger volume than normal (which was not commercially acceptable) but also had no brown color and had too large air cavities. After some experimentation, a commercially acceptable bread was produced using water with a redox potential of about 300 mv and without additives.

It will be appreciated by persons skilled in the art that the present invention is not limited by what has been particularly shown and described hereinabove. Rather the scope of the present invention is defined only by the claims which follow:

What is claimed is:

1. A method for transferring a physical-behavior-information characteristic including at least one member selected from the group consisting of taste, smell and biological activity, the method comprising:

provinding a fluid that includes water molecules;

disposing in said fluid a material that has a physical-behavior information characteristic including at least one member selected from the group consisting of taste, smell and biological activity;

imparting said physical-behavior-information characteristic from said material to hydrogen of said water molecules of said fluid; and passing air past said fluid, thereby transferring to said air the physical-behavior-information characteristic of said material wherein at least one member selected from the group consisting of the imparting and passing air steps comprises providing a barrier that is permeable to passage therethrough of hydrogen from a first side of said barrier to a second side of said barrier, said barrier being substantially impervious to passage therethrough of a hydrogen-donor material;

wherein said material disposed in said fluid, said material having said physical-behavior-information characteristic, imparts, to hydrogen of water molecules of said fluid contacting a first side of said barrier, said physical-behavior-information characteristic of said material, wherein said hydrogen of said water molecules, which has said physical-behavior-information characteristic of said material, is absorbed in the first side of said barrier and passes through said barrier to said air that includes water molecules and contacts the second side of said barrier, thereby transferring said physical-behavior-information characteristic to hydrogen of said water molecules of said air.

2. A method according to claim 1 wherein said material comprises a cathode material.

3. A method according to claim 1 wherein said material comprises an odorant and said physical-behavior-information characteristic comprises an odor of said odorant.

4. A method according to claim 1 wherein the physical-behavior-information characteristic of said material comprises a biological effect of said material.

5. A method according to claim 1 wherein said physical-behavior-information characteristic comprises a taste of said material.

6. A method according to claim 1 wherein said material comprises a metal.

7. A method according to claim 1 wherein said material comprises disinfecting material, said physical-behavior-information characteristic comprises toxicity of said material and said second fluid comprises air, wherein transferring the toxicity of said material to the air disinfects the air.

8. A method according to claim 1 further comprising freezing said fluid after said hydrogen has passed into said fluid.

* * * * *